(12) United States Patent
Fox et al.

(10) Patent No.: US 7,489,812 B2
(45) Date of Patent: Feb. 10, 2009

(54) CONVERSION AND ENCODING TECHNIQUES

(75) Inventors: Simon Richard Fox, Heathmont (AU); Julien Charles Flack, Swanbourne (AU); Philip Victor Harman, Scarborough (AU)

(73) Assignee: Dynamic Digital Depth Research Pty Ltd., Bentley, WA (AU)

( * ) Notice: Subject to any disclaimer, the term of this patent is extended or adjusted under 35 U.S.C. 154(b) by 1037 days.

(21) Appl. No.: 10/164,005

(22) Filed: Jun. 7, 2002

(65) Prior Publication Data

US 2003/0228034 A1 Dec. 11, 2003

(51) Int. Cl.
G06K 9/00 (2006.01)

(52) U.S. Cl. ................................. 382/154

(58) Field of Classification Search ........... 382/154, 382/285; 348/43
See application file for complete search history.

(56) References Cited

U.S. PATENT DOCUMENTS

| | | | |
|---|---|---|---|
| 5,748,199 A | * | 5/1998 | Palm ................... 345/473 |
| 5,793,900 A | * | 8/1998 | Nourbakhsh et al. ...... 382/263 |
| 6,031,564 A | * | 2/2000 | Ma et al. ................... 348/43 |
| 6,049,625 A | | 4/2000 | Sakamoto |
| 6,351,572 B1 | | 2/2002 | Dufour |
| 6,504,569 B1 | * | 1/2003 | Jasinschi et al. .......... 348/43 |
| 7,035,451 B2 | * | 4/2006 | Harman et al. ........... 382/154 |
| 2002/0048395 A1 | * | 4/2002 | Harman et al. ........... 382/154 |
| 2002/0061131 A1 | * | 5/2002 | Sawhney et al. .......... 382/154 |

FOREIGN PATENT DOCUMENTS

| | | |
|---|---|---|
| EP | 0735512 B1 | 6/2002 |
| WO | WO 96/29678 A1 | 9/1996 |
| WO | WO 99/30280 * | 6/1999 |
| WO | WO 02/01503 A2 | 1/2002 |

* cited by examiner

*Primary Examiner*—Tom Y Lu
(74) *Attorney, Agent, or Firm*—Banner & Witcoff, Ltd.

(57) ABSTRACT

A method of creating at least one depth map for an image sequence including the steps of receiving depth data for a plurality of points in the image sequence, utilising the depth data and a classifier to ascertain depth characteristics as a function of image characteristics and relative position and creating a depth map for at least one frame of the image sequence utilising the image characteristics.

15 Claims, 4 Drawing Sheets

CONVERSION AND ENCODING TECHNIQUES

FIELD OF THE INVENTION

The present invention is directed towards an improved technique for deriving depth maps from 2D images, in particular the present invention relates to a method of recovering dense depth maps from a set of sparse 3D points associated with an image sequence.

BACKGROUND OF THE INVENTION

Structure-from-Motion (SfM) is a collection of methods for recovering 3D information of a scene that has been projected on to the planar 2D film back plane of a camera. The structural information derived from a SfM algorithm typically takes the form of a set of projection matrices, one projection matrix per image frame, representing the relationship between a specific 2D point in the image plane and its corresponding 3D point. SfM algorithms rely on tracking specific image features to determine such structural information concerning the scene. Generally speaking only a small percentage of an image can be accurately tracked—these points usually lie on edges and corners where sharp intensity discontinuities provide unambiguous tracking cues.

Similarly, stereo or multi-ocular disparity analysis may be used to determine 3D points from 2D images. As with SfM analysis, 3D points can only be established for a small percentage of an image at locations where there is sufficient contrast to unambiguously determine correspondences with a second image.

In many applications including, but not limited to stereoscopic image rendering, robotic navigation and special effects animation, such sparse 3D points are insufficient. Such applications require a dense depth map in which each 2D point in an image is associated with a 3D point.

Prior art for conversion of sparse 3D points to dense depth maps relies on either spatial interpolation of the sparse 3D data or hypothesise-and-test approaches such as the RANSAC algorithm. Both these approaches only use the sparse 3D point data available at each individual image frame. This leads to two major shortcomings—first, the number of sparse points available in any single image may not be sufficient to accurately derive a dense depth map and secondly, the consistency of the depth maps from one frame to the next may be poor. The present invention discloses a method for deriving dense depth maps from sparse 3D data that addresses these shortcomings.

The applicants have disclosed in co-pending PCT application number PCT/AU01/00975, the contents of which are herein disclosed by reference, a method for generating depth maps from one or more images. This method involved a two step process. In the first step sparse depth data associated with a single image was used to generate a depth map for the image. In the second phase depth maps for each image in an image sequence were generated using the results generated in phase one. Whilst this method works in ideal situations, there are many limitations to the process. In the applicants prior application it was necessary to select a number of key frames in an image sequence. For each of these key frames it was necessary to know the depth data for a sufficient number of pixels within that key frame such that an equation to generate a corresponding depth map could be generated. That is, given the depth for a sufficient number of pixels within the key frame, a function could be derived such that the depth for every other pixel could be determined. Once these functions were generated for the key frames they could then be used to in turn generate functions for the remaining frames.

One of the limitations of the applicants prior process is the necessity for two phases. It will be appreciated that if an error is introduced in the first phase for whatever reason, then this error is propagated throughout the second phase. In such a situation the resultant depth maps may not be satisfactory.

Of greater concern is that for phase one to be completed satisfactory, it is necessary to know the depth for a sufficient number of pixels within a key frame, in order to solve an equation to generate the depth map for that key frame. For example, if a key frame has 350,000 pixels then ideally the depth for 17,500 pixels (or 5% of the total number of pixels) would be known so as to enable a function for the depth map to be generated. If the number of pixels for which the depth is known is not sufficient, the quality of the resulting depth map will not be adequate. If unable to generate an accurate depth map for a key frame, then it is unlikely that phase two will be able to be completed successfully. There is therefore a need for a simplified process for the generation of depth maps.

OBJECT OF THE INVENTION

It is therefore an object of the present invention to provide an improved system for the generation of depth maps from a 2D image sequence which does not require a two phase process and is not dependent on the depth for a requisite number of pixels in a key frame to be known.

SUMMARY OF THE INVENTION

With the above object in mind the present invention provides in one aspect a method of creating at least one depth map for an image sequence including the steps of:
receiving image data of a plurality of frames;
receiving depth data of a plurality of points in at least one of said plurality of frames;
utilising said image data and said depth data to determine an algorithm to ascertain depth characteristics as a function of image data;
determining a depth map for at least one said frame utilising said algorithm.

In a further aspect the present invention provides a method of creating at least one depth map for a 2D image sequence including a plurality of frames, each said frame including a plurality of points, said method including the steps of:
receiving depth data for a plurality of said points in at least one said frame;
determining image data for said points having said depth data;
inputting said depth data and said image data into a classifier to encode the relationship between said image data and said depth data;
deriving a depth map for at least one said frame of 2D image utilising said encoded relationship.

In yet a further aspect the present invention provides a method of creating depth maps for an image sequence including the steps of:
receiving depth data for a plurality of points in said image sequence;
utilising said depth data to train a classifier to ascertain depth characteristics as a function of image characteristics;
creating a depth map for each frame of said image sequence utilising said image characteristics.

In still a further aspect the present invention provides a method creating depth maps for an image sequence including the steps of:

dividing said image sequence into a plurality of image shots;

for each image shot receiving depth data for a plurality of points and utilising said depth data to train a respective classifier to create an initial algorithm to ascertain depth characteristics as a function of image characteristics and relative position;

creating at least one combined algorithm by combining at least two initial algorithms from a plurality of said shots;

creating a depth map for each frame of said image sequence using said at least one combined algorithm.

In a further aspect the present invention provides a method of creating at least one depth map for an image sequence including the steps of:

dividing said image sequence into a plurality of image shots;

receiving depth data for a plurality of points in at least one image shot;

utilising said depth data and a classifier to ascertain depth characteristics as a function of image characteristics and relative position; and creating a depth map for at least one frame of said at least one image shot utilising said image characteristics.

The image data may include RGB values for each point or pixel, and may also include relative XY positions. The present invention may also include the initial step of determining depth data for a number of points within the image. The depth data may be determined either manually, automatically, or a combination of manual and automatic means.

When dividing an image sequence into a series of shots, the preferred embodiment of the present invention will combine the outcome of the two classifiers on either side of each frame.

DETAILED DESCRIPTION OF THE INVENTION

Figure 1:
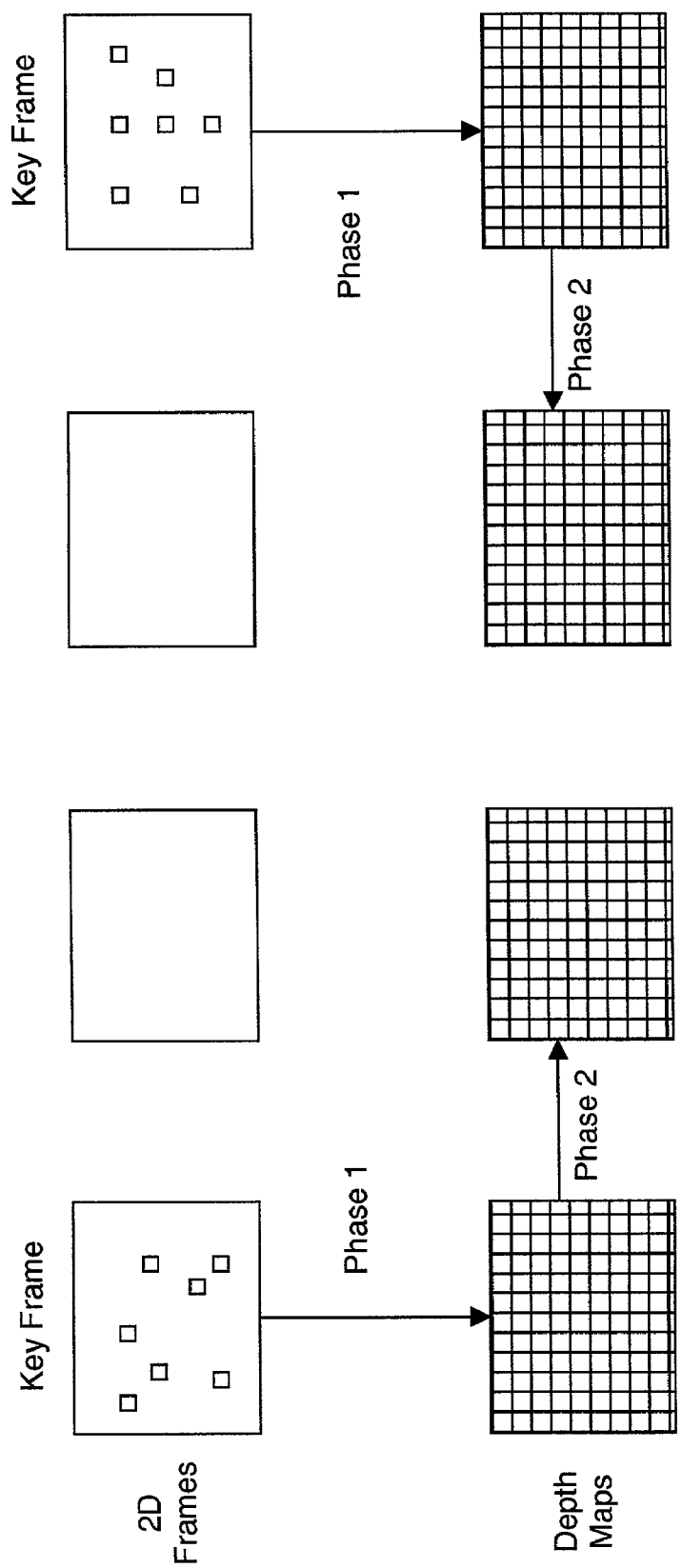
FIG. 1 illustrates the working of the applicants co-pending patent application.

A depth map represents the 3D profile of a scene from a specific viewpoint. When a dense depth map is associated with a 2D image it encodes the distance between the camera used to capture the image and the observed objects for each pixel in the image. An objective of the present invention is to recover a depth map given only a sparse set of 3D points, which may be derived from one of the following means.

To achieve this an image sequence containing a number of image frames may be decomposed into a series of shots. A shot ideally contains one or more image frames in which the inter-frame differences are relatively small. The frequency and placement of shot boundaries in an image sequence may be dependent upon the motion in the sequence. Shot boundaries may be identified manually by an operator or automatically using a shot detection algorithm. A shot detection algorithm takes as input a sequence of image frames and outputs one or more shot boundaries. The shot boundaries effectively partition the image sequence into one or more groups, such that the difference between successive images within any group is relatively small. Automatic shot detection algorithms are commonly based on image differencing. For example, to determine whether a shot boundary should be inserted between two successive images of a sequence the total difference between each pixel of the two images is computed. If this difference is above a pre-defined threshold then a shot boundary is inserted.

A 3D point may be defined as a 2D point with an associated depth value that represents the distance of the point from the camera and may be generated by any one or any combination of the following processes:

1. Structure-from-motion algorithms: Such algorithms will initially identify a number of feature points in a first image and attempt to locate the same feature points in a subsequent image. High contrast regions such as the corners and edges of objects are generally the most reliable features identified for tracking. Once sufficient corresponding 2D points have been located it is possible to derive 3D points. For example, if 8 corresponding 2D points between two images are known then the Longuet-Higgens algorithm may be used to recover the epipolar geometry between the images. In combination with the camera calibration matrix the corresponded 2D points may be triangulated to find their recovered 3D positions.

2. Stereo or multi-ocular algorithms: If an image sequence is captured using two or more cameras in a fixed relative arrangement then correspondences between the images of each camera can be used to derive depth estimates by triangulation. As with SfM algorithms, corresponding points may only be reliably identified in high contrast regions, limiting the number of accurate 3D points that may be determined from such algorithms.

3. Manual point correspondence or direct depth assignment: 3D points may be manually identified either by indicating correspondences between points in two or more images or by directly associating a depth value with a single 2D point.

The present invention uses a classifier to encode the relationship between 2D point (inputs) and 3D points (outputs). A classifier can be considered an algorithm that encodes the relationship between a set of inputs and a set of outputs. A classifier has an internal configuration that may be in a number of different states. In supervised classification the classifier adapts its internal state using examples of the relationship between inputs and outputs. This process can be referred to as training a classifier. The classifier may be trained using the 3D points derived from the processes described above. Alternatively, a classifier may be selected which does not require training.

For the purposes of clarification, we describe a 2D point at a location x, y in an image occurring at a time t within an image sequence as:

$$P\{x, y, t, I\}$$

where I is the set of image characteristics of the point P. In the preferred embodiment the image characteristics I consist of the red, green and blue colour components of the 2D point P. Any other image characteristics including, but not limited to linear or non-linear combinations or higher order statistics of the red, green and blue components may also be used without affecting the nature of the invention.

Figure 3:
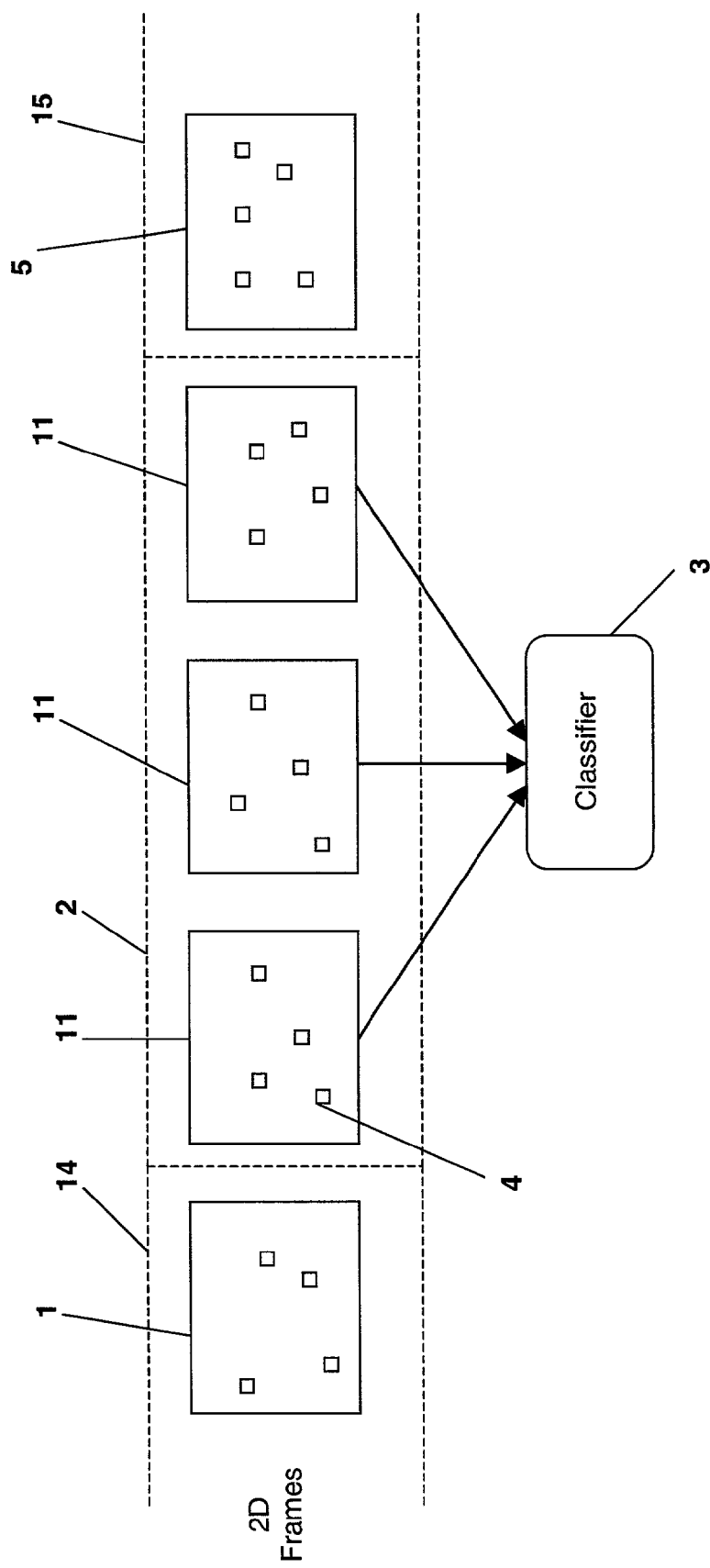
FIG. 3 illustrates the use of a classifier in one embodiment of the present invention.

A 3D point is defined as:

$$R=\{x, y, z, t, I\}$$

where z corresponds to the depth, or distance from the camera of the point R. 3D points that are generated by the techniques described above can be used to train a classifier. The classifier encodes the relationships between a set of 2D points and their corresponding 3D points. As this relationship varies over time a classifier is trained over a defined temporal interval T In the preferred embodiment this temporal interval coincides with the decomposition of the image sequence as identified by the shot detection. It should be noted that a single temporal interval T might contain one or more shots that are not adjacent in time. An image sequence may alternate between two or more different scenes, for example during a news interview when the camera alternatively focuses on the interviewer and the interviewee. In such circumstances the temporal interval T may contain all the images from one scene (say the interviewer). FIG. 3 shows an image sequence that has been decomposed using a shot detection algorithm so that the three frames in the center of the figure belong to a single shot 2. Frame 1 is an image in the previous shot 14 and frame 5 is an image in the subsequent shot 15. Each image frame in the shot has a number of 3D points 4 associated with it. It is not important whether the depth Z for each 3D point was derived manually or automatically, what is required is a series of points for which the depth is known. For simplicity these 3D points are represented by their projection on to the 2D image plane. All 3D points within the current shot are input to the classifier as training data regardless of which frame they are in.

A trained classifier 3 can represent the relationship or mapping between a 2D point P and a 3D point R over a temporal interval T:

$$C\{T\}: P\{x, y, t, I\} = R\{x, y, z, t, I\} \text{ if } t \text{ falls within the interval } T$$

In other words, a classifier trained using 3D points derived over a specific set of image frames can now be used to recover a depth value for any other 2D point over the same temporal interval.

Restricting a classifier to a specific temporal interval improves the accuracy with which it can recover 3D points from 2D points but may lead to results that are inconsistent over time. These inconsistencies generally manifest themselves at the temporal boundaries between two classifiers.

For example, consider the situation in which an image sequence has been decomposed into two shots. A classifier is trained for all the 3D points in each shot. Assume also that the first shot occupies image frames from $t_1$ to $t_2$ (inclusive) and the second shot image frames from $t_3$ to $t_4$ (inclusive). The image frame at $t_2$ will be classified using the first classifier and the image frame at $t_3$ will be classified using the second classifier. In certain situations this can cause a noticeable discontinuity in the recovered depth maps. That is, the objects in the first shot may appear at a particular depth as a result of the classification, however those same objects in the first shot may appear at a different depth in the second shot as a result of the second classifier. In this situation the images appear to jump around for the viewer.

In circumstances where this could be a problem preferred embodiments of the present invention address the consistency issue in two ways.

Before training a classifier is generally initialised to some random state. Depending on the nature of the classifier this initial state can have a significant influence on the final state of the classifier after training. To improve the consistency between two classifiers $C_1$ and $C_2$ where $C_2$ occurs after $C_1$, $C_2$ can be initialised to the same state as the classifier $C_1$'s initial state. Alternatively, $C_2$ may be initialised using a partially or fully trained state of the classifier $C_1$. For example, if we assume a first classifier is initialised to a random state s1. During training the classifier might change its state iteratively, for example from s1 to s50. A second classifier following the first classifier may be initialised to state s10, for example, instead of a random state. The process of initialising a first classifier with some state of a second classifier is referred to as bootstrapping the first classifier. Bootstrapping has the additional advantage of increasing the speed with which a classifier can be trained, as the starting state is generally closer to the final trained state.

In order to further improve the consistency of results two or more classifiers can be combined to determine a 3D point from a 2D point. As an example, consider that a classifier trained over a time interval from time $t_1$ to time $t_2$ is associated to a specific point in time, which is the midpoint between $t_1$ and $t_2$.

Figure 4:
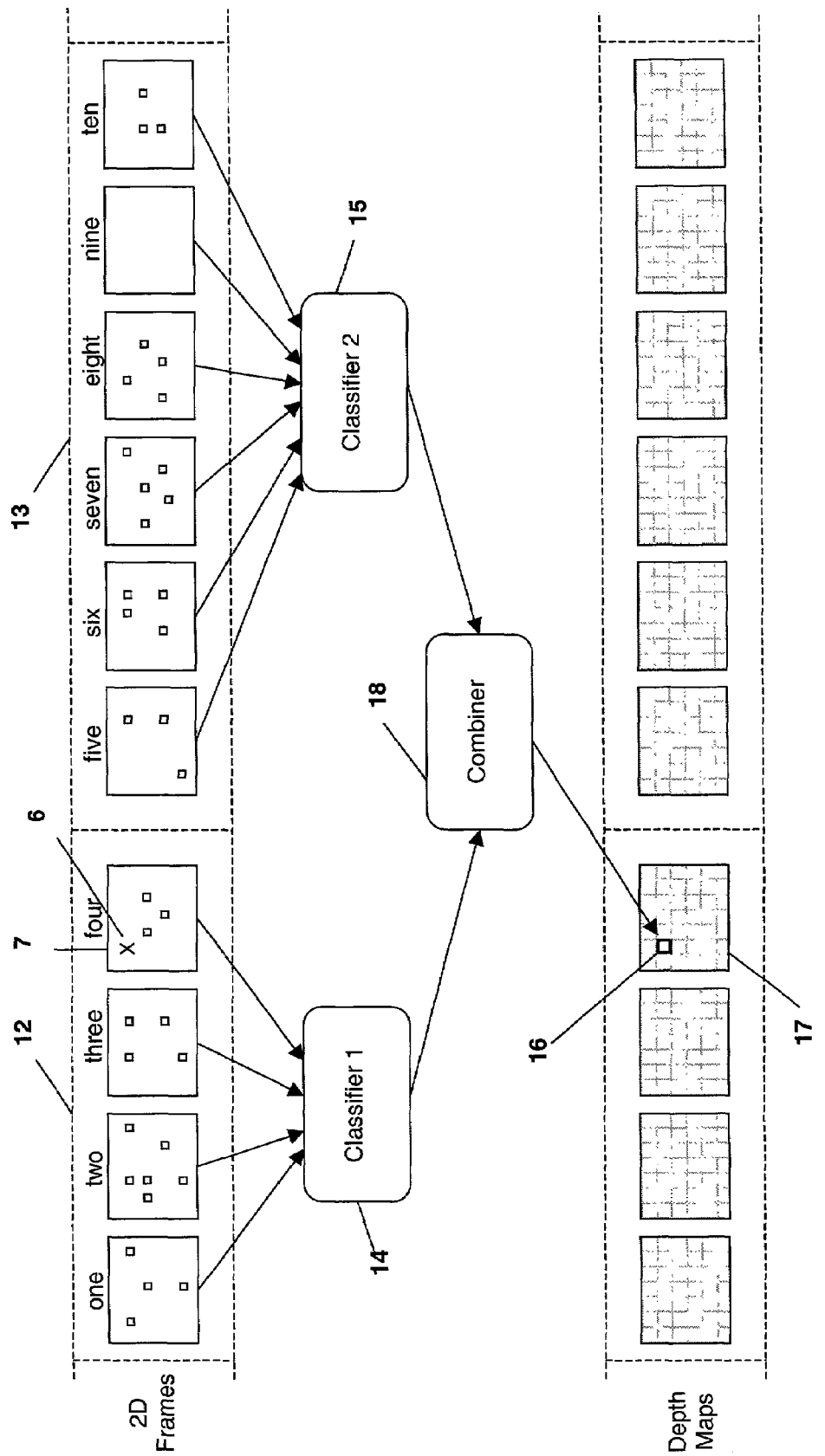
FIG. 4 illustrates a preferred embodiment of the present invention through the use of adjacent classifiers.

For any point $P\{x, y, t, I\}$ for which we wish to determine a 3D point we determine the two closest classifiers whose temporal midpoints occur immediately before and after time t. FIG. 4 shows an image sequence consisting of a number of image frames, which has been decomposed into two shots 12 and 13. The time t increases from left to right with each successive image frame. In order to determine a 3D point for a given 2D point 6 which is part of an image 7 within the shot 12 of the image sequence the first classifier 14 with a temporal midpoint immediately before and the second classifier 15 with a temporal midpoint immediately after the time t of the 2D point 6 can be combined.

Assuming that the first classifier 14 outputs a 3D point $R_1$ and the second classifier 15 outputs a 3D point $R_2$, given the 2D point P as input, a combination means 18 can produce an improved 3D point $R_3$ by combining $R_1$ and $R_2$. The combination means 181 can simply average $R_1$ and $R_2$, but ideally uses a weighted combination of its inputs. In a preferred embodiment the weight is based on the temporal distance between the point P and the classifier's temporal midpoint. As a further illustration of this process consider that the temporal midpoint of the first classifier 14, which has been trained over a temporal interval between $t_1$ and $t_2$ is defined as $T_{m1} = 0.5*(t_1+t_2)$. Similarly, the temporal midpoint of the second classifier 10, which has been trained over a temporal interval $t_3$ and $t_4$ is defined as $T_{m2} = 0.5*(t_3+t_4)$.

We may determine the relative contribution of the two classifiers by calculating respective weights $w_1 = (t-t_{m1})/(t_{m2}-t_{m1})$ for the first classifier 14 and $w2 = (t_{m2}-t)/(t_{m2}-t_{m1})$ for the second classifier 15. The improved 3D point $R_3$ may then be calculated as follows:

$$R_3 = w_1 * R_1 + w_2 * R_2$$

In an alternative embodiment, the weighting is determined by classification error estimates as opposed to temporal proximity.

Figure 2:
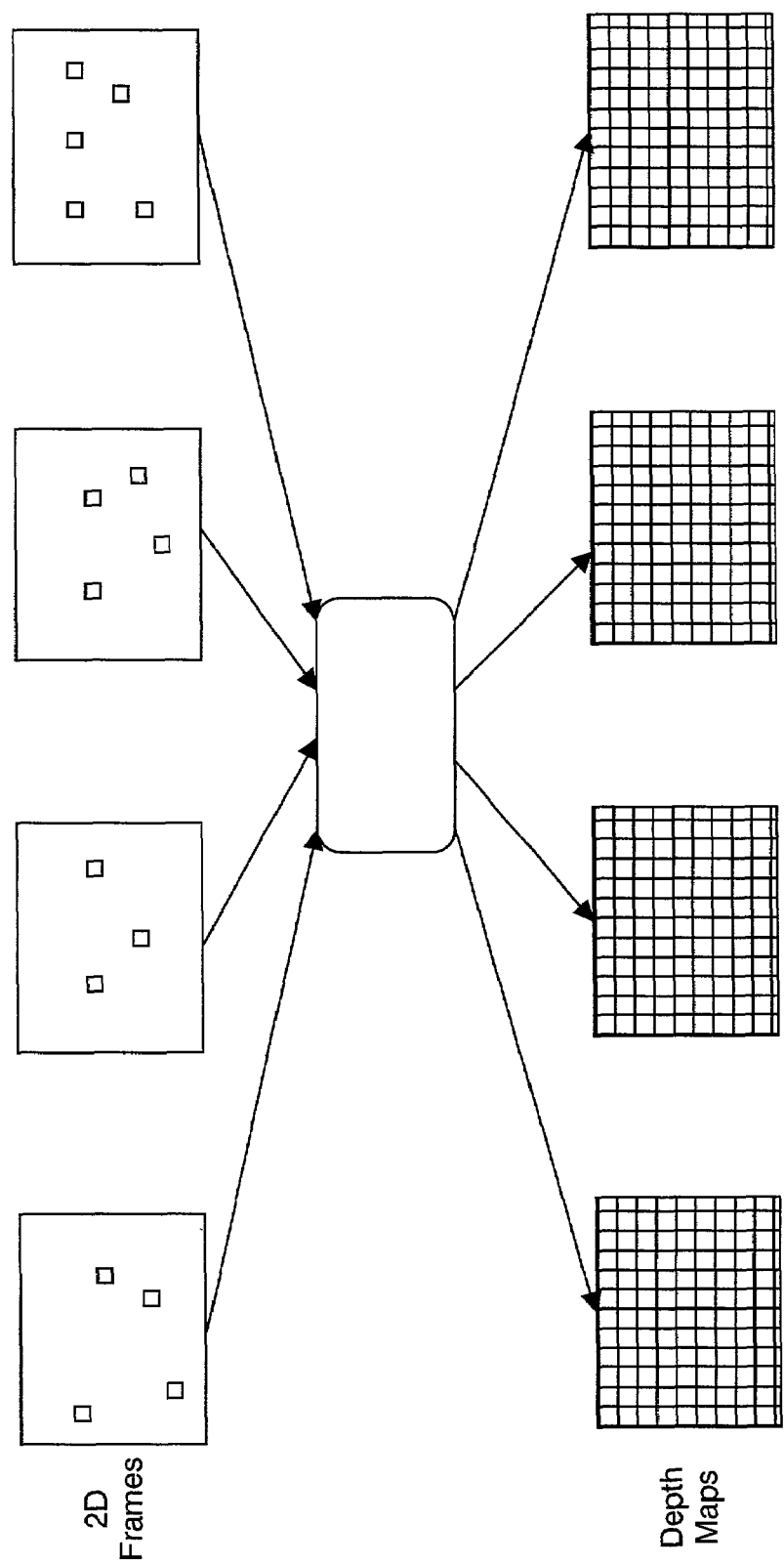
FIG. 2 demonstrates the operation of the present invention.

It will be appreciated that the present system differs significantly from the applicants prior system and thereby any other method for the generation of depth maps for an image sequence. As can be seen in FIG. 1, the applicants prior process required the selection of a number of key frames, and for the depth for a sufficient number of pixels within each key frame to be known. For each key frame, assuming that sufficient pixels had been assigned a depth, a depth map could then be created in phase one. The depth map for each key frame were then used to develop subsequent depth maps for the remaining frames in phase two. This process differs significantly from the present invention which is exemplified in FIG. 2. FIG. 2 shows that it is no longer necessary to select key frames from an image sequence. Further, it is no longer necessary to ensure that a particular frame or key frame, has a depth assigned to a sufficient number of pixels or points. Rather, the present invention takes depth and image data for a number of pixels across a number of frames to create the depth maps. It will be appreciated that the data for the classifier could come from a single frame, particularly if the image sequence is of a still object, but even in this situation it differs from the applicants prior application, in that the classifier is used to generate a depth map for each frame of the shot, rather than the prior system which generated two depth maps for two key frames and then used those key frame depth maps to generate subsequent depth maps.

It will be appreciated that in each case the image data for each pixel is known. That is, if we consider RGB components, for each pixel the system knows the relative XY position, and the RGB values. What is required is for a number of pixels across the shot sequence to have a depth assigned to them. This depth may be assigned manually, or automatically or a combination of manual or automatic. This information may then be passed to the classifier of the present invention to thereby create the depth map for each frame of the shot.

The system of the present invention may be further improved by utilizing the classifiers in adjacent shots. That is, rather than rely on the depth map generated solely by a single classifier, reference is made to a depth as generated by an adjacent classifier. Again this is exemplified in FIG. 4. In this case the first shot 12, includes four frames the data of which is fed into the classifier 14. Similarly, the adjacent shot 13 includes six frames the data of which is fed into the second classifier 15. In order to determine the depth for any point in any of the frames one to ten, for example, a point 16 in the fourth frame 17, the output from both classifiers is combined so as to determine the depth at that point. Ideally, the reliance on either classifier will be weighted in favor of a particular classifier dependent of which frame is being considered. For example, in the example of FIG. 4, the weighting of classifier 15 will be much greater in the fifth frame as opposed to the first frame. Similarly, the weighting of classifier 14 will be greater for frame five than for frame ten. For example, in the example of FIG. 4, the weighting of classifier 15 will be much greater in the fifth frame as opposed to the first frame. Similarly, the weighting of classifier 14 will be greater for frame five than for frame ten.

The weighting is designed to take into consideration the fact that the depth of objects within an image may change over time. It is also appreciated that the depth of an object will have some relevance to both the historical depth of the object, and also the future depth of the object. By weighting the various classifiers a smoother transition between shots may be achieved.

It will be appreciated that in a more complex system it could be possible to combine more than two classifiers so as to further improve the transitional smoothing. For example, three classifiers could be used including the classifier for a particular shot, and also the two adjacent classifiers on either side of the shot.

It was considered that the applicants prior system made significant advances from what was know at the time. The present system makes further significant advances from the applicants prior system. It is no longer necessary to perform a two phase process in order to determine depth maps for frames within any image sequence. Further, it is no longer necessary for a sufficient number of pixels within a single frame to be known so as to derive a depth map for phase one. Rather, whilst the present invention could rely on a single frame, it is capable of deriving information from a series of frames to thereby generate depth maps for each of those frames. Further, the present system will be able to perform even if no depth data is known for a particular frame, as shown for example by frame nine of FIG. 4. In this circumstance the classifier uses the known depth data in the remaining frames.

Whilst the method and apparatus of the present invention has been summarised and explained by illustrative application it will be appreciated by those skilled in the art that many widely varying embodiments and applications are within the teaching and scope of the present invention, and that the examples presented herein are by way of illustration only and should not be construed as limiting the scope of this invention.

We claim

1. A method of creating at least one depth map for an image sequence including the steps of:
   receiving depth data for a plurality of points across frames in said image sequence;
   utilizing said depth data and a classifier to ascertain depth characteristics as a function of image characteristics including RGB values;
   creating a depth map for at least one frame of said image sequence utilizing said image characteristics including the RGB values.

2. A method as claimed in claim 1, wherein said image characteristics further include relative positions.

3. A method as claimed in claim 1, further including an initial step of ascertaining depth data for at least a predetermined number of points within said image sequence.

4. A method as claimed in claim 1, including an initial step of bootstrapping said classifier.

5. A method of creating at least one depth map for an image sequence including the steps of:
   dividing said image sequence into a plurality of image shots;
   receiving depth data for a plurality of points in at least one of said image shots;
   utilizing said depth data and a classifier to ascertain depth characteristics as a function of image characteristics and relative position;
   creating a depth map for at least one frame of said at least one of said image shots utilizing said image characteristics.

6. A method as claimed in claim 5, wherein each shot is assigned a corresponding classifier.

7. A method as claimed in claim 6, wherein at least one corresponding classifier is initialized to a similar state as a previous classifier.

8. A method of creating at least one depth map for an image sequence including the steps of:
   dividing said image sequence into a plurality of image shots;
   for each image shot receiving depth data for a plurality of points and utilizing said depth data and a respective classifier to create an initial algorithm to ascertain depth characteristics as a function of image characteristics and relative position;
   creating at least one combined algorithm by combining at least two initial algorithms from a plurality of said image shots;
   creating a depth map for at least one frame of said image sequence using said at least one combined algorithm.

9. A method as claimed in claim 8, wherein said image characteristics include RGB values.

10. A method as claimed in claim 8, wherein said image characteristics include relative xy positions.

11. A method as claimed in claim 8, further including an initial step of ascertaining depth data for at least a predetermined number of points within said image sequence.

12. A method as claimed in claim 8, wherein said combined algorithm is determined using an average of said at least two initial algorithms.

13. A method as claimed in claim 8, wherein said combined algorithm is determined using a weighted average of said at least two initial algorithms.

14. A method as claimed in claim 8, including an initial step of initializing said classifier to a random state.

15. A method as claimed in claim 8, wherein at least one said respective classifier is initialized to a similar state as a previous classifier.

* * * * *